June 16, 1925.
H. B. GILLETTE
1,541,940
WHEEL FOR ROLLER BEARING DRY KILN TRUCKS
Filed Sept. 23, 1921
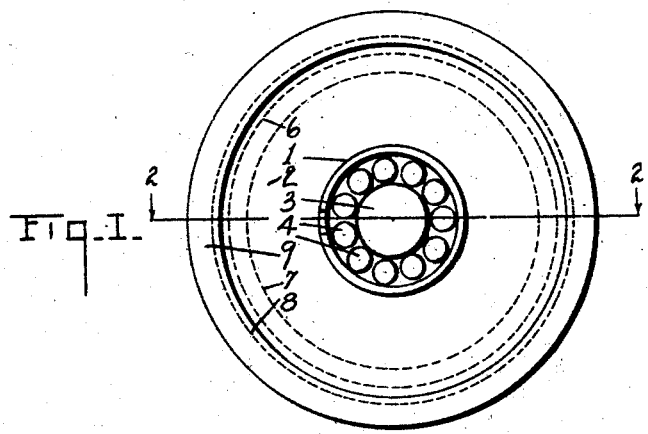
Fig. I.
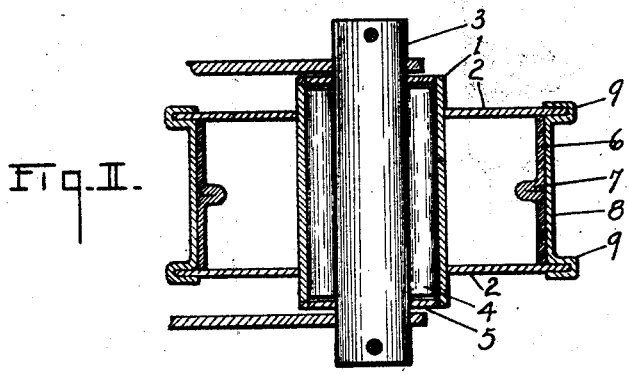
Fig. II.
INVENTOR.
Herbert B. Gillette
BY
ATTORNEYS.

Patented June 16, 1925.

1,541,940

UNITED STATES PATENT OFFICE.

HERBERT B. GILLETTE, OF GRAND RAPIDS, MICHIGAN.

WHEEL FOR ROLLER-BEARING DRY-KILN TRUCKS.

Application filed September 23, 1921. Serial No. 502,775.

*To all whom it may concern:*

Be it known that I, HERBERT B. GILLETTE, a citizen of the United States, residing at Grand Rapids, county of Kent, State of Michigan, have invented certain new and useful Improvements in Wheels for Roller-Bearing Dry-Kiln Trucks, of which the following is a specification.

This invention relates to improvements in wheels for roller bearing dry kiln trucks and for similar purposes.

The object of the invention is to provide such a wheel made of sheet metal having a reinforced tread and flanges.

Objects pertaining to the details of construction and operation will definitely appear from the detailed description to follow.

I accomplish the objects of my invention by the devices and means described in the following specification. The invention is clearly defined and pointed out in the claims.

A structure which is a preferred embodiment of my invention is fully illustrated in the accompanying drawing forming a part of this specification, in which:

Fig. I is a side elevation view of a roller bearing wheel embodying my invention with the roller retaining washer removed.

Fig. II is a detail sectional view, taken on line 2—2 of Fig. I, showing the wheel disposed in a dry kiln truck having a body with sheet metal side walls.

In the drawing, similar numerals of reference refer to similar parts throughout the several views.

Considering the numbered parts of the drawing, the wheel is made up of a hub 1, side disks 2 carried on a suitable hub 1, having roller bearings 4 and retaining washer 5.

The main tread 6 of the wheel has an upset inwardly-projecting peripheral rib 7 and is disposed between the disk-like sides 2 of the wheel within their peripheries to form the wheel flanges. An auxiliary tread 8 fits the main tread 6 and has extended flange portions 9 spun over the edges of the disks 2, thereby reinforcing and supporting the same and presenting a smooth finished edge with all sharp corners eliminated.

The feature of the reinforced main tread can, of course, be used independently, although it does not present a perfect finished appearance, and likewise the auxiliary tread with its flanges would make an effective wheel for light duty. I wish to claim the wheel with these various features specifically, and broadly as well, as pointed out in the appended claims.

Having thus described my invention what I claim as new and desire to secure by Letters Patent is:

1. A fabricated sheet metal wheel comprising a suitable hub, side disks, a main cylindrical tread of sheet metal having an inwardly projecting peripheral strengthening rib upset therein, an outer auxiliary tread of sheet metal, the edges of which are folded and conformed over the periphery of the disks to form wheel flanges, as specified.

2. A fabricated sheet metal wheel comprising side disks, a main cylindrical tread of sheet metal having an inwardly projecting peripheral strengthening rib upset therein, an outer auxiliary tread of sheet metal, the edges of which are folded and conformed over the periphery of the disks to form wheel flanges, as specified.

3. A fabricated sheet metal wheel comprising side disks, a main cylindrical tread of sheet metal, an auxiliary tread of sheet metal, the edges of which are folded and conformed over the periphery of the disks to form wheel flanges and retain the main tread and side disks and flanges together, as specified.

4. A fabricated sheet metal wheel comprising side disks, a main cylindrical tread disposed between said disks, an outer auxiliary cylindrical tread of sheet metal, the edges of which are folded and conformed over the periphery of the disks to form wheel flanges and retain the main tread and side disks and flanges together, as specified.

In witness whereof, I have hereunto set my hand and seal.

HERBERT B. GILLETTE. [L. S.]